March 16, 1965   W. HERGERT   3,173,525
CLUTCHES

Filed May 17, 1962   4 Sheets-Sheet 1

INVENTOR
Wilhelm HERGERT

March 16, 1965  W. HERGERT  3,173,525
CLUTCHES
Filed May 17, 1962  4 Sheets-Sheet 2

INVENTOR
Wilhelm HERGERT

Ooms, McDougall & Hersh attys.

INVENTOR
Wilhelm HERGERT

March 16, 1965 W. HERGERT 3,173,525
CLUTCHES
Filed May 17, 1962 4 Sheets-Sheet 4
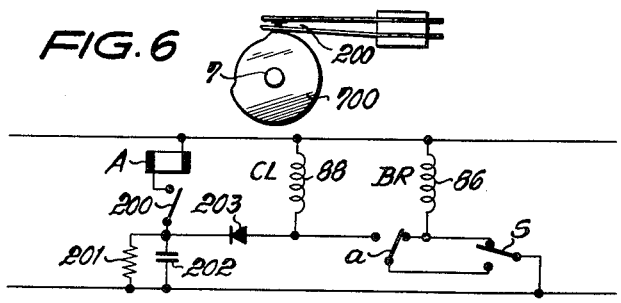
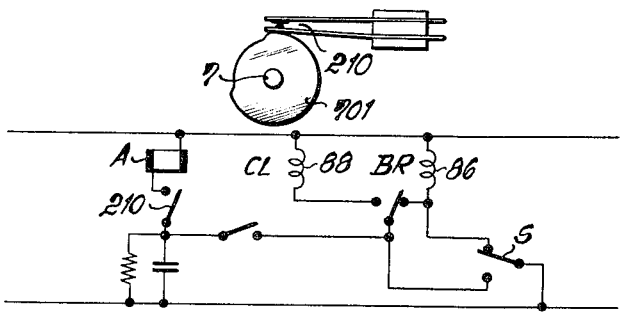
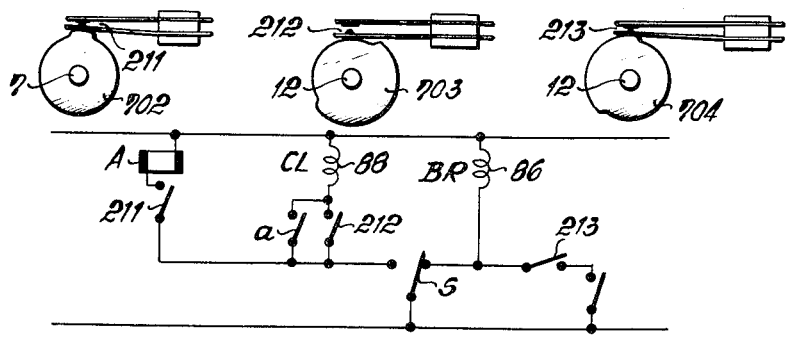
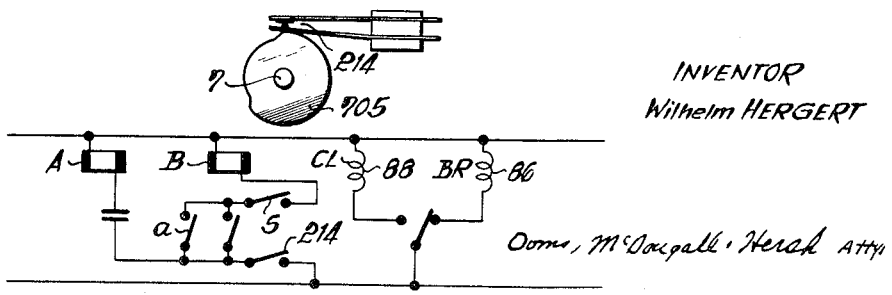
INVENTOR
Wilhelm HERGERT
Ooms, McDougall· Hersh Atty.

United States Patent Office 3,173,525
Patented Mar. 16, 1965

3,173,525
CLUTCHES
Wilhelm Hergert, Wilhelmshaven, Germany, assignor to
Olympia Werke AG
Filed May 17, 1962, Ser. No. 195,616
Claims priority, application Germany, May 20, 1961,
O 8,070
9 Claims. (Cl. 192—4)

This invention relates to a stop position coupling for single- or multiple-revolution operation, which can be used with advantage to drive start-stop devices, such as tape perforators or tape readers in which a tape is advanced one step at a time between two stationary data-transmitting devices.

Conventionally, start-stop couplings of this kind comprise a continuously rotating input shaft and an output shaft for connection to the device to be driven, the output shaft being mechanically or electromagnetically connected with the input shaft only for the duration of a predetermined time, usually one or more complete revolutions. For instance, in one known single-revolution coupling a continuously rotating input shaft is rigidly secured to an input coupling plate and the output shaft is rigidly connected to an output coupling plate. A coupling pin is so mounted in the output coupling plate as to be movable parallel to the output shaft and can be moved into and out of engagement with the input coupling plate by engaging elements and spring means. The input coupling plate is formed with a number of apertures in one of which the pin can engage during the engaged state.

A coupling of this kind has a number of disadvantages. The time of engagement cannot be determined accurately, the coupling pin rubbing over the plate before engaging in a corresponding aperture. Also, the output shaft is accelerated abruptly when the coupling pin enters an aperture in the input coupling plate, with the further disadvantage that not only is the driving motor loaded undesirably but, for instance, the feed perforations in a perforated tape are so stressed that they may tear at high speeds or be deformed at low speeds, in either case making it difficult, if not impossible, for the spacings between the perforations to be kept at the international standard value.

In another known single-revolution coupling comprising a continuously rotating input and output coupling plate, the two plates are in positive engagement with another for the engaged state, but during the disengaged state the output coupling plate is connected to the input coupling plate by way of a friction clutch and a spring-loaded claw and slot type shaft coupling, and a bevelled part of the output coupling plate is thrust against the abutment of a latching-in coupling lever in order to move the output coupling plate axially against the force of a spring and to disengage the output coupling plate from the input coupling plate. As in the case previously described, the initially stationary output coupling plate is coupled with a continuously rotating input coupling plate. As in the previous case, there is appreciable slip or rubbing during the engagement procedure, since the coupling elements which provide the engagement are not opposite one another when in the disengaged state and must first be moved into a position in which the coupling can be engaged. The coupling is engaged and disengaged in the same way as in the coupling first described, that is, abruptly, with the result that there is considerable stressing, and, for instance, the perforating or reading speeds are limited.

Couplings having friction linings can be operated more gently but because of their slip are inaccurate in operation, particularly where the number of load changes per unit of time is elevated.

It is an object of this invention to obviate the disadvantages of the known start-stop couplings and to provide a coupling ensuring reliable engagement with frequent load changes per unit of time yet without overstressing of individual components. The invention accordingly provides a stop-position coupling having an input coupling plate and an output coupling plate adapted to be moved together in a positive connection when moved relatively to one another through the agency of coupling elements, wherein the input coupling plate takes the form of a sliding pin drive which is oscillated through the agency of a crank drive; and the sliding pin drive is coupled and uncoupled when the angular velocity is passing through zero.

In contrast to the prior art, in the novel coupling according to the present invention, coupling and uncoupling are performed not between a rotating element and a stationary element but between two stationary elements, thus making sure that there is no slip or rubbing prior to engagement. The output element is not accelerated abruptly by the rotating input element of the coupling but is accelerated and retarded together therewith and gradually, so that even at high speeds of operation the forces of acceleration and retardation which are operative in the motor and at the edges of the perforations in the tape do not become excessive.

Advantageously, the crank drive is preceded by planetary gearing, and the transmission ratios of the crank drive and of the planetary gearing are so adapted to one another that the angular speed of the sliding pin drive varies between a maximum and zero. Consequently, the sliding pin drive is not compelled to reverse its direction of movement; instead, it rotates continuously in the same direction but at different angular speeds. To provide a simple mechanical construction of the novel coupling, a satellite carrier is rigidly secured to the input shaft and carries one or more freely rotatable spindles which are disposed at a distance $2r$ from the input shaft axis and which each have one crank, of crank radius $r$, which is so guided by the sliding pin drive as to be adapted to move radially in relation to the input shaft, and a satellite which has the tooth number $z$ and which meshes with a stationary sunwheel having the same number of teeth $z$ and being freely rotatable on the input shaft. Advantageously, magnets can be provided to shift the output coupling plate. To save space, the magnet windings are formed as toroidal windings disposed concentrically with the input and output shafts. Current is supplied to the windings directly and not through slip rings. Correct switching of the magnets is ensured by contacts adapted to be operated, for instance, by cams provided on the input or output shaft. The magnet for engaging the output plate with the sliding pin drive is called a "coupling magnet" and the magnet for engaging the output plate with the locking device is called a "braking magnet." Of course, the braking magnet can be replaced by mechanical actuating elements which can equally well be operated pneumatically or hydraulically.

Other features, advantages and possible uses of the invention, more particularly the arrangement of the armatures associated with the toroidal windings and the arrangement of the contacts for operating the same, will become apparent from the following description of embodiments, reference being made to the accompanying drawings wherein:

FIGURE 6 is a circuit diagram for the braking magnet and coupling magnet and shows one position of the associated cam;

FIGURE 7 illustrates a circuit arrangement for the braking magnet and coupling magnet and a position of the associated cam;

FIGURE 8 illustrates a circuit arrangement of the braking magnet and coupling magnet and also shows the associated cam, and FIGURE 9 illustrates another arrangement of the braking magnet and the coupling magnet with one position of the associated cam.

Figure 1:
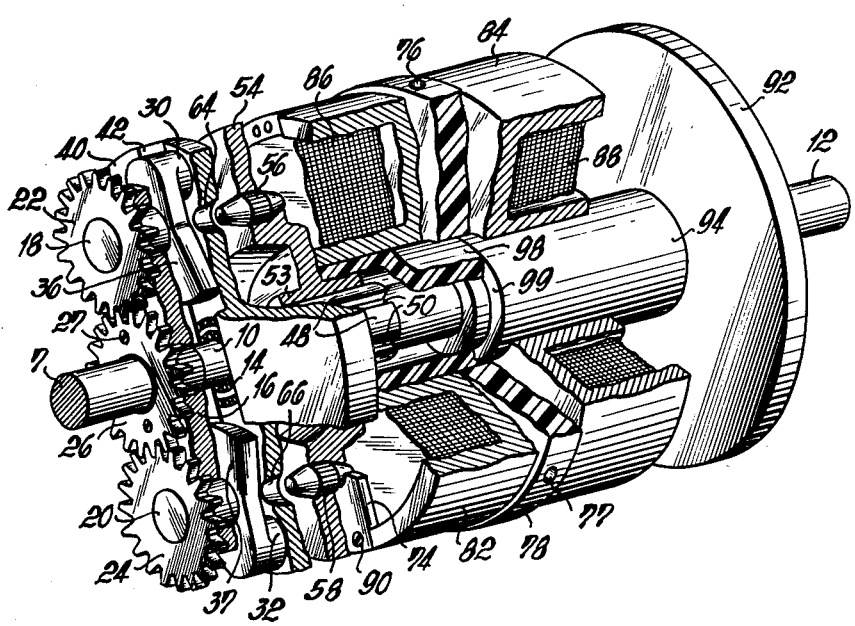
FIGURE 1 is a perspective view of a coupling according to one form of the invention, in the disengaged position.
Figure 2:
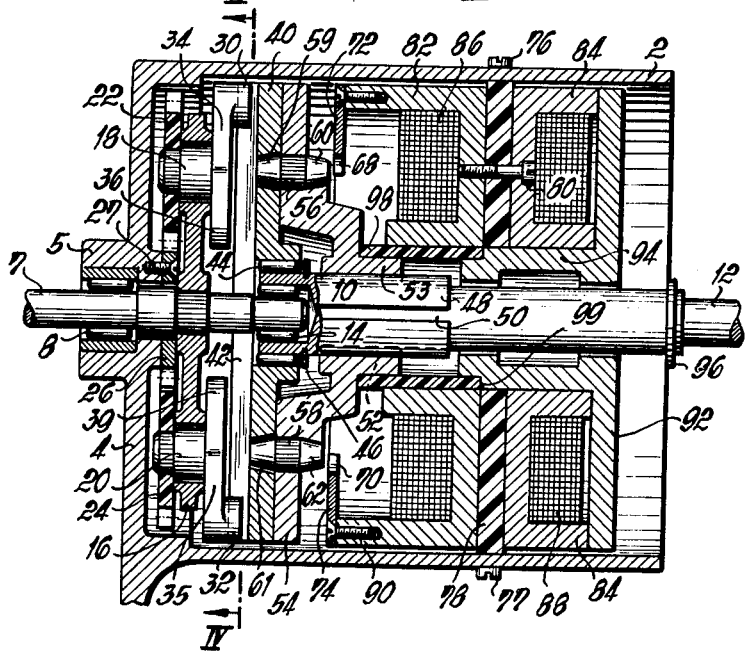
FIGURE 2 is a longitudinal section through the coupling illustrated in FIGURE 1 but in the engaged position.
Figure 4:
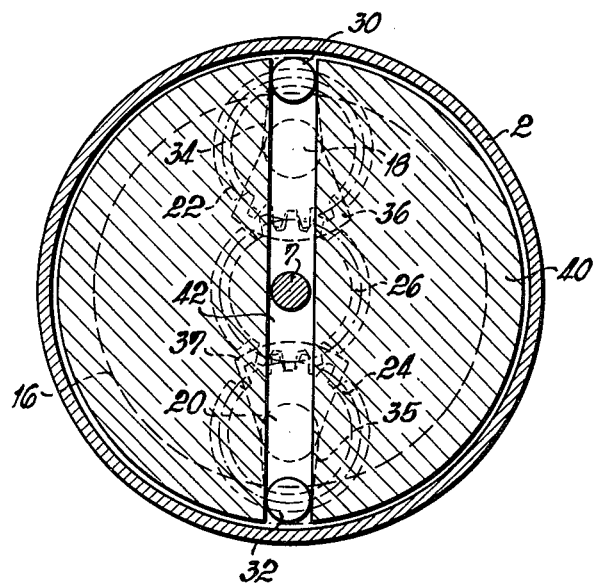
FIGURE 4 is a section taken along the line IV—IV of FIGURE 2.

The coupling illustrated in FIGURES 1, 2 and 4 is disposed in a cylindrical casing 2 having an end member 4 comprising a bearing member 5. Received in a passage of the member 5 is a needle bearing 8 in which an input shaft 7 is rotatably mounted. Input shaft 7 terminates in a journal 10 on which a second needle bearing 14 is disposed. At its end inside the coupling casing 2, an output shaft 12 is formed with a bore which is pushed over needle bearing 14. The two shafts 7, 12 are therefore mounted coaxially with one another and one inside the other. The second bearing for output shaft 12 is disposed outside casing 2 and is not shown. A satellite carrier 16 is secured to input shaft 7 in some conventional form, for instance, by shrink fitting or by press-fitting. Satellite carrier 16, which can be in the form, for instance, of a disc or of any other kind of appropriate member, has passages in which short spindles 18, 20 are rotatably mounted. Satellite wheels 22, 24 are rigidly secured to those ends of spindles 18, 20 which are near casing end member 4; satellite wheels 22, 24 engage with a sunwheel 26 which, through the agency of a screw 27, is connected to casing end member 4 coaxially with shaft 7. The clearance between the bore in sunwheel 26 and the input shaft 7 is sufficient for the shaft 7 to rotate freely. Those ends of the spindles 18, 20 which are remote from casing end member 4 comprise cranks 30, 32 having crank arms 34, 35 and appropriate counterweights 36, 37. A sliding pin drive 40 is rotatably mounted on output shaft 12 through the agency of needle bearing 44 and is formed, on the side near casing end member 4, with an elongated slot 42. Cranks 30, 32 slide in slot 42. Axial movement of sliding pin drive 40 on output shaft 12 is limited by circlip 46 which is received in a transverse groove in output shaft 12. End 48 of shaft 12 is formed with axial guiding grooves 50 and driving webs 52 on which hub 53 of a coupling plate 54 is disposed. Hub 53 is so devised as to be adapted to slide axially on output shaft end 48 and also to be able to drive output shaft 12 by way of webs 52.

Plate 54 comprises coupling pegs 56, 58 having conical ends 59, 60 and 61, 62 respectively which project from both sides of plate 54. When the coupling is in the engaged state, the conical ends 59, 61 engage in matching recesses 64, 66 in sliding pin drive 40, thus providing a positive connection between input shaft 7 and output shaft 12. When the coupling is in the disengaged state, the conical ends 60, 62 engage in recesses 68, 70 of web-like members 72, 74 which are rigidly secured to coupling casing 2, for instance, by screws 90, thus ensuring that output shaft 12 is locked in a definite position when the coupling is in the uncoupled state.

Output plate 54 is moved axially by magnetic means. A magnet is provided for each movement of the output plate 54. The coupling magnet and the braking magnet are both of toroidal form and are introduced into casing 2 coaxially with output shaft 12. A ring 78 made of an amagnetic material is secured to casing 2 by screws 76, 77 between toroidal yoke 82 of the braking magnet and toroidal yoke 84 of the coupling magnet. Yokes 82, 84 are connected to ring 78 by means of a screw. Magnet windings 86, 88 are disposed inside the yokes. The current supply and operation of the magnetic windings will be described hereinafter. Web members 72, 74 are secured to the outer ring of yoke 82 of the braking magnet by screws 90 and are formed with recesses 68, 70 engageable by pins 56, 58. The magnetic flux of yoke 82 of the braking magnet passes through plate 54 which, as already stated, can slide axially on output shaft 12. To close the circuit for the flux of the coupling magnet 84, 88 another coupling plate 92 is provided, the hub 94 of which can slide axially on output shaft 12 and is so secured thereto as to be readily rotatable thereon.

A sleeve 98 is disposed, concentrically with output shaft 12, between plate 54 and the hub 94 of plate 92. Sleeve 98 bears against hub 53 of plate 54 and against a shoulder 99 of hub 94 of plate 92. Movement of plate 92 to the right is limited, as can be seen in FIGURE 2, by a circlip 96 received in a transverse groove in output shaft 12.

Figure 3:
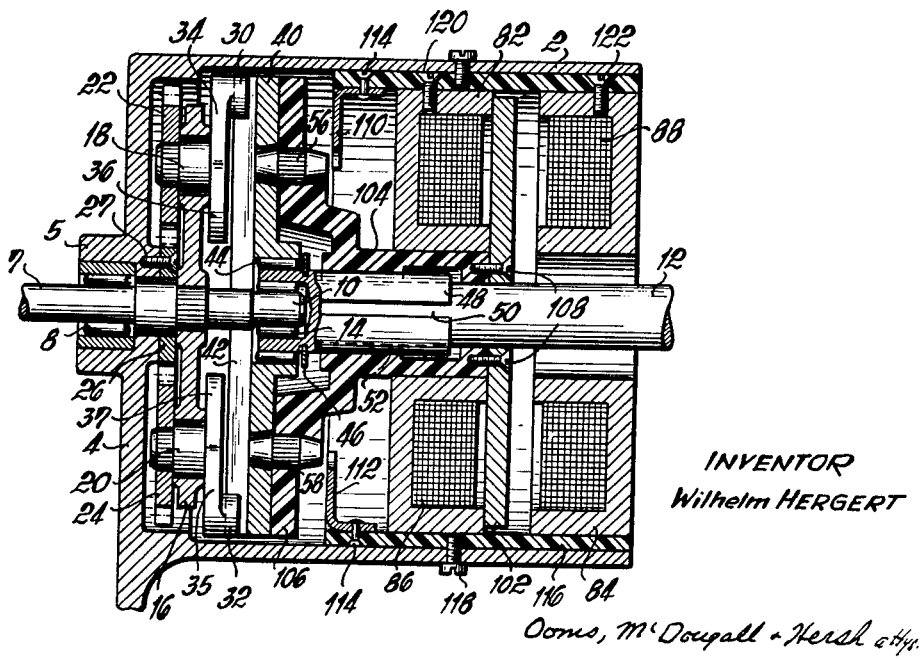
FIGURE 3 is a longitudinal sectional view through an alternative form of the invention.

An alternative form of the coupling according to the invention is illustrated in FIGURE 3. Fundamentally, the construction is the same as in the embodiment just described, except that output coupling plate 106 is made of a magnetic substance and has an extended hub 104 which is slidable on output shaft 12 and which, just as in the first embodiment, can drive output shaft 12 through the agency of axial grooves 50 and webs 52. A disc-shaped armature 102 is secured to the end of hub 104 by means of screws 108. The yoke of braking magnet 84 is annular and secured by screws 122 to a cylinder 116 made of an amagnetic substance. A toroidal winding 88 is disposed in yoke 84. Annular yoke 82 of the coupling magnet is secured by screws 120 to the cylinder 116. The amagnetic cylinder for securing the yokes of the coupling magnet and braking magnet is secured by screws 118 in the cylindrical case of the coupling.

As in the first embodiment, angle-members 110 and 112 are provided which lock the coupling pins 56, 58 in the braking state. Angle members 110, 112 are rivetted to ring 116 at 114. The yokes of the braking magnet and coupling magnet are so disposed in the casing that, depending upon the state of energisation of the magnets, the common armature 102 can attracted by either of the magnets.

The mechanical construction of the coupling illustrated in FIGURE 3 is simpler than the construction of the coupling illustrated in FIGURE 2 and sticking between the sliding pin drive, the output coupling plate and the output shaft because of residual magnetism is completely excluded. The continuously rotating input shaft 7 drives the satellite carrier 16 rigidly connected to it so that the satellite wheels 20, 22 on spindles 18, 20 roll continuously around the stationary sunwheel 26. The cranks 30, 32 rigidly secured to the satellite wheels by way of spindles 18, 20 perform a corresponding rotation and, through the agency of the crank arms 34, 35 engaging in slot 42, drive the sliding pin drive 40 at a varying angular speed.

In both embodiments the distance between the axis of input shaft 7 and the axes of spindles 18, 22 is equal to twice the crank radius $r$, and the number of teeth $z_1$ of satellite wheels 22, 24 is equal to the number of teeth $z_2$ of sunwheel 26.

Assuming that the axes of rotation of the cranks were stationary relatively to the casing 2 and that the cranks were to rotate around their axes of rotation at an angular velocity $\omega_O$, then the angular velocity of the sliding pin drive 40 in relation to the axis common to the input and output shafts 7, 12 would vary between:

$$\omega_{S_{max}} = \omega_O \times \frac{r}{r+2r} = \frac{1}{3}\omega_O$$

(crank in position furthest from axis)

and:

$$\omega_{S_{min}} = \omega_O \times \frac{r}{r-2r} = \omega_O$$

(crank in position nearest axis).

Because of the rotation of input shaft 7, and since satellite carrier 16 is driven at the input angular speed $\omega_{input}$, which, since $z_1 = z_2$ is always equal to $\omega_O$, the angular speed $\omega_O$ is superimposed upon the angular speeds $\omega_S$ just mentioned, so that:

$$\omega_{output_{max}} = \omega_O + \omega_{S_{max}} = \tfrac{4}{3} \omega_{input}$$
$$\omega_{output_{min}} = \omega_O + \omega_{S_{min}} = 0$$

that is, when input shaft 7 rotates at the angular speed $\omega_{input}$, sliding pin drive 40 rotates at an angular speed which varies between 0 and $\tfrac{4}{3} \omega_{input}$.

Figure 5:
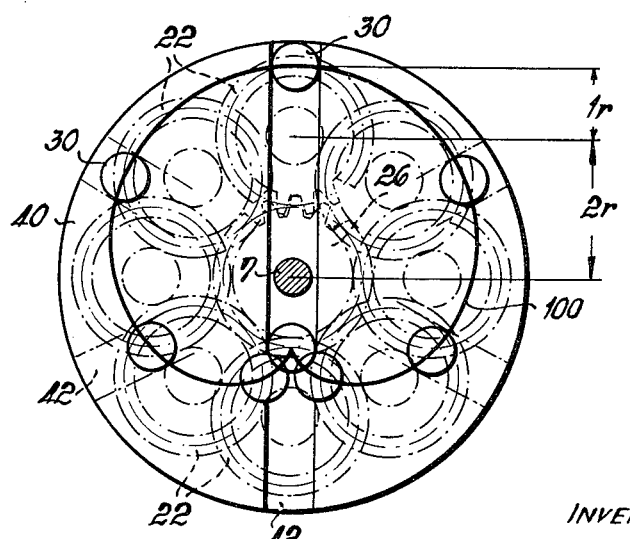
FIGURE 5 is a section similar to FIGURE 4 and diagrammatically indicating various phases of the movement during one revolution of a satellite.

FIGURE 5 diagrammatically illustrates various phases in the motion of satellite wheel 22 and of the crank arm 34 associated therewith. Starting from the position nearest the axis at the angular speed $\omega_{output_{min}} = 0$ (bottom of FIGURE 5), crank arm 34 moves, as satellite wheel 22 rotates, along a cardioid path 100 in slot 42 in sliding pin drive 40, its motion being outwards into the position furthest from the axis associated with the angular speed $\omega_{output_{min}} = \tfrac{4}{3} \omega_{input}$ (top of FIGURE 5), then returns the initial position nearest the axis.

As FIGURE 5 shows, there is one such rise and fall of the angular speed during one complete revolution of the sliding pin drive. The braking and coupling magnets must be so operated that engagement and disengagement always occurs when the angular speed $\omega_{output} = 0$, that is, at zero relative speed between the two parts which are to be engaged with one another. From the time of coupling, the speed of output shaft 12 slowly increases from zero to the maximum $\omega_{output} = \tfrac{4}{3} \omega_{input}$, but there is no overloading of the driving motor nor of the feed perforations in the perforated tape. Similarly, the speed of output shaft 12 decreases to zero relatively slowly, so that there is no abrupt change of load at disengagement. The toroidal windings 86, 88 are energized alternately, and the energizations are so controlled that the arrangement formed by plate 54, sleeve 98 and plate 92 is always shifted for an engagement or disengagement when the angular speed of the sliding pin drive 40 is passing through zero.

When the winding 88 of the coupling magnet has been energized and pulls armature 92 towards core 84, so that plate 54 is moved to the left (FIGURE 2) through the agency of sleeve 98, the coupling pins 56, 58 in plate 54 engage with the sliding pin drive 40 so that output shaft 12 is driven thereby. When winding 88 is de-energized and braking magnet winding 86 is energized instead, said winding 86 pulls the ferromagnetic plate 54 to the right (FIGURE 2) so that pins 56, 58 disengage from sliding pin drive 40 and engage by their conical ends 60, 62 in the recesses 68, 70 in the web members 72, 74. Plate 54 and with it output shaft 12 are then locked. The magnets are controlled through the agency of cam-operated switches, the cams of which can be disposed on the output shaft or input shaft of the coupling. The input shaft must rotate continuously when the data-transmitting station is in the stand-by condition, but the coupling must start to operate only when, for instance, it is required to perforate or scan a perforated tape. The circuit must therefore include a switch S ensuring that the circuits for the braking magnet and the coupling magnet are energized only when a start order has been given. The start order can be given by a key, by a special symbol on the perforated tape or by a corresponding order station.

Various ways in which the magnets can be connected for the coupling according to the invention are illustrated in FIGURES 6 to 9.

FIGURE 6 shows that winding 86 of the braking magnet is energized continuously so that output shaft 12 is locked in the position determined by coupling pins 56, 58. Closing and opening of a switch 200 which is adapted to be operated by a cam 700 disposed on the input shaft 7 has no effect on a relay A. A changeover contact $a$ can change over only after the order previously referred to has changed over switch S. When cam 700 closes the switch 200, relay A, with a delay determined by the values of resistance 201 and of capacitance 202, changes over its changeover contact $a$ and the coupling magnet picks up. Of course, cam 700 is so disposed on shaft 7 that engagement occurs exactly at the time when the relative speed between the coupling plates and the sliding pin drive is zero. When cam 700 opens contact 200, relay A drops and changeover contact $a$ connects winding 86 of the braking magnet into circuit, so that the output shaft is stopped after one complete revolution and disengaged from the input shaft. A rectifier element 203 must be provided for the circuit arrangement shown in FIGURE 6.

FIGURE 7 illustrates the basic circuit diagram for a similar system. The arrangement operates only when switch S has been changed over to "engage."

FIGURE 8 illustrates a circuit arrangement controlled by three cams 702, 703 and 704. Cam 702 is disposed on input shaft 7 and cams 703, 704 are disposed on output shaft 12. Switch S must be operated in response to an order before the coupling magnet winding 88 can be energized through the agency of the cam-controlled switch 211 and the relay A.

FIGURE 9 illustrates a circuit arrangement in which two relays A, B are provided one to control the braking magnet and the other to control the coupling magnet. The circuit arrangement is ready to operate once contact S has closed and, just like the arrangement illustrated in FIGURE 6, can be controlled by the cam 705 on the input shaft 7. The braking magnet 86 can be controlled by any other orders, as may be necessary, for instance, when the engaged state is required to last for a number of revolutions. Of course, a circuit element of this kind must be adjusted to the stop positions of the coupling.

The coupling hereinbefore disclosed can in principle be used with any kind of start-stop device but provides particular advantages when used to drive tape perforators and tape scanners. It will often be advantageous for the couplings to be stopped by mechanical disengaging devices controlled by rotation of the operative shaft.

A particular advantage provided by the coupling according to the invention in high-speed perforations is that the feeding wheel engages very reliably in the feed perforations of the tape, and this reliability cannot be provided by other couplings. In feeding devices not having the coupling according to the invention, the or each engagement perforation is missed, more particularly close to the limit speeds, so that engagement is effected with delay, if at all.

Another advantage, particularly with high-speed perforators, is that because of the non-uniform rotation of the coupling according to the invention, coupling can be achieved at low angular speeds down to $\omega = 0$, the output speed of the coupling possible being as much as 33% above the input speed.

I claim:

1. A start-stop coupling device comprising an input shaft, a rotatable member carried by said shaft, crank drive means rotatably mounted on said member, a sliding pin drive, said crank drive means being operatively connected to said sliding pin drive, means for continuously rotating said input shaft whereby said crank drive means imparts a non-uniform, unidirectional, rotational motion to said sliding pin drive, an output shaft, a second rotatable member carried by said output shaft, and means for releasably coupling said second member to said sliding pin drive.

2. Coupling as set forth in claim 1, wherein the crank drive means are rotated by planetary gearing; and wherein the transmission ratios of the crank drive and of the planetary gearing are so adapted to one another that the angular speed of the sliding pin drive varies between a maximum and zero.

3. Coupling as set forth in claim 2, wherein the planetary gearing comprises a satellite carrier rigidly secured to the input shaft, at least one rotatable spindle carried by said carrier and disposed at a distance $2r$ from the input shaft axis and having one crank, of crank radius $r$, which is so guided by the sliding-pin drive as to be adapted to move radially in relation to the input shaft, a satellite wheel carried by said spindle and having the tooth number $z$, and a stationary sunwheel having the same number of teeth $z$ and being freely rotatable on the input shaft and meshing with said satellite.

4. A coupling device as set forth in claim 1 wherein said releasable coupling means comprise at least one pin fixed to said second member, at least one opening for receiving said pin defined in said sliding pin drive, and means for shifting said second member axially of said output shaft to move said pin in and out of said opening.

5. A coupling device as set forth in claim 4 including at least one locking device located for engagement by said pin when the pin is shifted out of said opening to thereby lock said output shaft against rotational movement.

6. A coupling device as set forth in claim 5 wherein two annular magnetic windings are disposed concentrically with the output shaft, one such winding when energized being adapted to shift said second member to engage said pin within said opening, and the other such winding when energized being adapted to shift said second member to engage said pin with said locking device.

7. Device as set forth in claim 6, wherein a discoid armature rigidly coupled mechanically with the second member and common to the annular magnetic windings is so disposed therebetween as to be freely movable relatively to the output shaft.

8. Coupling as set forth in claim 7, wherein the annular magnetic windings are energized through the agency of switches operated by cams.

9. Coupling as set forth in claim 8, wherein the cams are so disposed on the input or output shaft that the electromagnetic coupling and uncoupling is performed exactly at that position of the output shaft at which $\omega_{output}=0$.

References Cited in the file of this patent
UNITED STATES PATENTS

| | | |
|---|---|---|
| 2,232,091 | Battin | Feb. 18, 1941 |
| 2,861,672 | Buhrer | Nov. 25, 1958 |
| 3,008,339 | Gerber | Nov. 14, 1961 |
| 3,025,740 | Sorkin | Mar. 20, 1962 |